No. 636,036. Patented Oct. 31, 1899.
E. G. GOODELL & W. B. HASKINS.
LOCKING ATTACHMENT FOR PHOTOGRAPHIC APPARATUS.
(Application filed May 15, 1899.)
(No Model.)

WITNESSES.
O. B. Barnziger
M. Hickey

INVENTORS.
Edward G. Goodell
William B. Haskins
By Newell S. Wright
Their Attorney.

UNITED STATES PATENT OFFICE.

EDWARD G. GOODELL AND WILLIAM B. HASKINS, OF DETROIT, MICHIGAN.

LOCKING ATTACHMENT FOR PHOTOGRAPHIC APPARATUS.

SPECIFICATION forming part of Letters Patent No. 636,036, dated October 31, 1899.

Application filed May 15, 1899. Serial No. 716,804. (No model.)

*To all whom it may concern:*

Be it known that we, EDWARD G. GOODELL and WILLIAM B. HASKINS, citizens of the United States, residing at Detroit, county of Wayne, State of Michigan, have invented a certain new and useful Improvement in Novel Locking Attachments for Photographic Apparatus; and we declare the following to be a full, clear, and exact description of the invention, such as will enable others skilled in the art to which it appertains to make and use the same, reference being had to the accompanying drawings, which form a part of this specification.

Our invention has for its object a novel locking attachment for photographic apparatus; and it consists of the construction, combination, and arrangement of devices hereinafter described and claimed, and illustrated in the accompanying drawings, in which—

Figure 1:
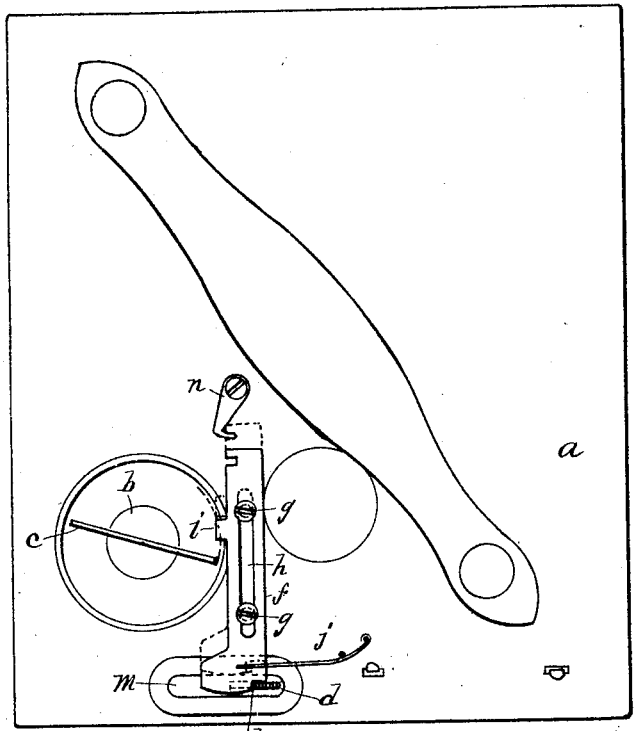
Figure 5:
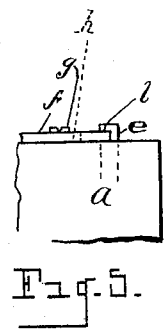
Figures 2, 3, 4:
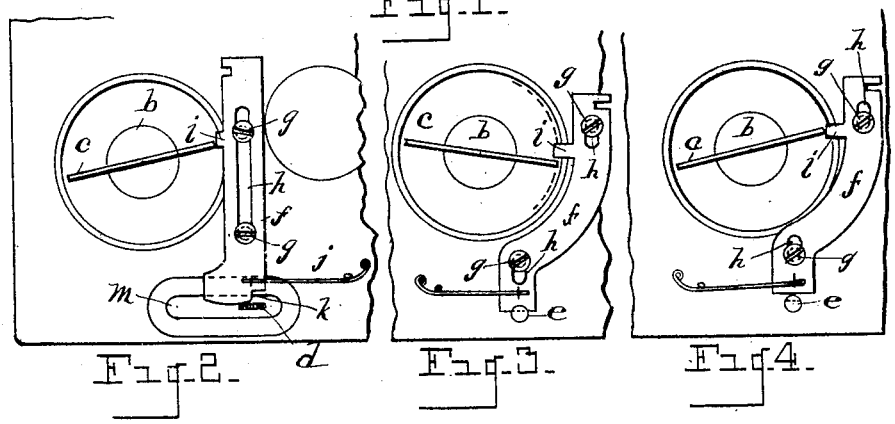

Figure 1 is a view in plan showing our attachment applied to a customary form of photographic apparatus, the attachment being in locked position. Fig. 2 is a partial view of the same, showing the device in unlocked position. Fig. 3 is a similar view, illustrating a modification, showing the attachment in locked position. Fig. 4 is a similar view showing the modification of the attachment in unlocked position. Fig. 5 is a partial side elevation of the modification shown in Figs. 3 and 4.

Our invention applies more particularly to cameras and other photographic apparatus in which film-rolls are used. Heretofore amateurs have experienced no little difficulty in the use of such apparatus in consequence of forgetfulness to properly rotate the film-holder and film-roll after making one exposure in order to bring another portion of the film into proper position for a subsequent exposure.

Our invention is intended to provide means whereby a double instantaneous exposure or "snap-shot" upon the same portion of the film cannot possibly be made, our invention being designed to provide means for locking the shutter until the film-roll has been rotated to bring a successive portion of the film into proper position for a subsequent exposure.

To these ends, as illustrated in the drawings submitted herewith, a photographic apparatus of any desired construction is indicated at $a$, the same being provided with a roller for actuating the film-roll, (indicated at $b$,) said roller projecting to the exterior of the case of the apparatus and being customarily provided with an operating handle or head $c$.

The customary lever for working the shutter is indicated at $d$. The foregoing parts may be of any ordinary construction. The lever $d$ is the customary oscillatory lever; but our invention is not limited solely to photographic devices provided with an oscillatory lever to actuate the shutter. Accordingly, as shown in Figs. 3, 4, and 5, an ordinary press button or stem is indicated at $e$, arranged to be depressed in a customary manner to actuate the shutter.

We would have it understood that our invention contemplates the provision of our attachment to photographic devices provided with any ordinary or shutter-actuating mechanism.

As shown in the drawings, we provide a dog $f$ arranged to lock the shutter-actuating mechanism, said dog being arranged to be unlocked by the rotation of the roller for actuating the film-roll. As illustrated in the drawings, the dog $f$ may consist of a reciprocatory slide secured upon the photographic apparatus, as by screws $g$, the slide being formed with one or more elongated slots $h$ to permit its reciprocation. The slide is shown formed with a shoulder $i$, projecting into the annular path of the head $c$ of the roller $b$, so that when said roller is rotated the head or operating-handle $c$ of the roller will strike against the shoulder $i$ and move the dog into unlocked position. Any suitable spring $j$ may be employed to keep the dog in normally-locked position. Where an oscillatory lever is employed to actuate the shutter, the adjacent end of the slide may be constructed with a shoulder (indicated at $k$) to abut against one edge of the lever, the remaining end of the slide projecting into the path of the lever to prevent its movement. The locked position, as already mentioned, is shown in Fig. 1, and it is obvious that when the dog is in this position the lever $d$ cannot be thrown to actuate the shutter and the slide will remain in locked position until the roller $b$ has been rotated to withdraw the dog, and thereby to bring a portion of the film into position for operation. When the dog is in unlocked position, as indicated in Fig. 2, it is obvious that the lever may be actuated. It will be evident that whenever the lever $d$ is in normal position the slide will also be in locked position.

Where a button or stem $e$ is used, as shown in Figs. 3, 4, and 5, the said button or stem may be provided with a recess, as indicated at $l$, into which the forward end of the dog or slide $f$ normally projects to prevent the depression of the button or stem until the dog has been moved into unlocked position by the rotation of the roller $b$, as heretofore explained. In the modification shown the slide may be varied in form or outline simply to adjust it to the location of the button or stem relative to the roller for actuating the film-roll. The shape of the dog and the particular manner of its engagement with the shutter-actuating mechanism may be varied within the scope of our invention. Where an oscillatory lever $d$ is employed, it will be understood that it operates in an elongated slot $m$ in a customary manner. The dog is arranged thus to be withdrawn automatically by the turning of the roller for actuating the film-roll, while the shutter-actuating mechanism is automatically locked until said roller is actuated.

The attachment is more particularly designed, as above expressed, for taking instantaneous views or snap-shots. For time exposures the dog may be held out of normal position by any suitable means, as by a latch, (indicated at $n$,) engageable with the rear end of the dog.

What we claim as our invention is—

1. In a photographic apparatus, the combination with shutter mechanism, of mechanism to feed a film-roll, and a locking device actuated by the mechanism for feeding the film-roll to prevent the movement of the shutter, the shutter mechanism and the mechanism to feed the film-roll being separately actuated, substantially as described.

2. In a photographic apparatus, the combination with shutter mechanism, of a roller for feeding a film-roll, and a locking device actuated by said roller to prevent the movement of the shutter-actuating mechanism, said shutter mechanism and said roller being separately actuated, substantially as described.

3. In a photographic apparatus, the combination with shutter mechanism, of a roller for feeding a film-roll, and a locking-dog to project into the path of the shutter-actuating mechanism, said dog actuated by the movement of said roller, said shutter mechanism and said roller being separately actuated, substantially as described.

4. In a photographic apparatus, the combination with shutter-actuating mechanism, of a roller for feeding a film-roll, a locking-slide to project into the path of the shutter-actuating mechanism and means to restore said slide to normally-locked position, said shutter mechanism and said roller being separately actuated, and said slide actuated by the movement of said roller, substantially as described.

5. In a photographic apparatus, the combination with shutter mechanism, of means for feeding a film-roll, a locking device to prevent a movement of the shutter, and means to hold the locking device out of locked position, said shutter mechanism and said roller being separately actuated, and said locking device actuated by the means for feeding the film-roll, substantially as described.

6. In a photographic apparatus, the combination with a shutter-actuating device, of a roller for actuating the film-roll, and a reciprocatory slide engaged upon said apparatus and arranged to project into the path of the shutter-actuating mechanism, whereby said slide will be actuated by the movement of said roller, substantially as described.

7. In a photographic apparatus, the combination with a shutter-actuating device, of a roller for actuating a film-roll, a self-retracting reciprocatory slide normally projecting into the path of the shutter-actuating mechanism and arranged to be withdrawn from normal position by the movement of said roller, substantially as set forth.

8. In a photographic apparatus, the combination with a shutter-actuating device, of a roller for actuating a film-roll, a reciprocatory slide normally projecting into the path of the shutter-actuating mechanism and arranged to be retracted by the movement of said roller, and means to hold said slide out of position to be actuated by said roller, substantially as set forth.

In testimony whereof we sign this specification in the presence of two witnesses.

EDWARD G. GOODELL.
WILLIAM B. HASKINS.

Witnesses:
N. S. WRIGHT,
M. HICKEY.